United States Patent [19]
Cooley

[11] Patent Number: 5,214,921
[45] Date of Patent: Jun. 1, 1993

[54] MULTIPLE REFLECTION SOLAR ENERGY ABSORBER

[76] Inventor: Warren L. Cooley, P.O. Box 2392, Davis, Calif. 95617

[21] Appl. No.: 643,117

[22] Filed: Jan. 18, 1991

[51] Int. Cl.⁵ .............................. F03G 7/00; F24J 2/18
[52] U.S. Cl. ................................. 60/641.15; 60/641.8; 126/690; 126/648; 126/709
[58] Field of Search ............. 60/641.8, 641.13, 641.14, 60/641.15; 126/439, 441

[56] References Cited

U.S. PATENT DOCUMENTS

| | | | |
|---|---|---|---|
| 1,700,675 | 1/1929 | Goddard | 126/451 |
| 1,969,839 | 8/1934 | Goddard | 136/439 |
| 4,026,273 | 5/1977 | Parker | 126/441 X |
| 4,449,515 | 5/1984 | Nilsson, Sr. | 126/430 |
| 4,494,529 | 1/1985 | Lew | 126/439 |
| 4,945,731 | 8/1990 | Parker et al. | 60/641.15 |

OTHER PUBLICATIONS

*High Collection Nonimaging Optics*, W. T. Wreford/R. Winston, Jun. 1989 Academic Press Inc. pp. 195–199.

Primary Examiner—Stephen F. Husar

[57] ABSTRACT

This invention the multiple reflection solar energy absorber makes possible the direct absorption of solar energy into a transparent working fluid, thereby heating the fluid and discharging it through a nozzle to produce power. The invention comprises a method for producing an ultra high concentration of solar flux and a means to circulate the working fluid into an interior cavity confining the ultra high energy concentration producing absorption of heat energy. The apparatus of the invention comprises a primary and a secondary solar energy concentrator, a multiple reflection chamber, a working fluid, a nozzle and thermal insulation. The invention can be constructed in several embodiments suitable for heating both liquids and gases.

11 Claims, 4 Drawing Sheets

MULTIPLE REFLECTION SOLAR ENERGY ABSORBER

BACKGROUND FIELD OF THE INVENTION

This invention relates to solar energy more specifically the conversion of concentrated solar energy into thermal energy. My invention produces an ultra high concentration of solar energy resulting in the rapid absorption of heat energy into a fluid.

BACKGROUND DISCUSSION OF THE PRIOR ART

Heretofore thermal solar energy devices have been primarily of two types nonconcentrating (flat plate collectors) and concentrating (parabolic dishes and troughs). Regardless of the type the greatest majority of these devices include a black body element of some configuration which facilitates the solar energy transfer to a working fluid. The amount of heat that can be transferred in these types of devices is generally a function of the absorptive and emissive characteristics of the black body element and the amount of surface area contacted by both solar energy and a working fluid. Numerous methods and materials have been included in the design of solar energy devices with black body elements to increase the rate and efficiency of heat transfer.

Solar concentrating devices are most relevant to the invention described herein. In these devices the need for large absorptive and emissive element surface areas has resulted in solar receivers of significant weight and size. The disadvantages of this limitation has resulted in large, heavy, expensive designs that can only be cost-effectively utilized in large thermal power systems designed for commercial power generation. In 1934 Dr. Robert H. Goddard patented an Apparatus For Absorbing Solar Energy, U.S. Pat. No. 1,969,839, this device utilized the principle of direct solar energy absorption to effect a heat transfer in a working fluid. Dr. Goddards invention eliminates many of the problems inherent in solar absorbing devices that rely on black body elements to effect heat transfer. A significant object of Goddards device was to create a "relatively large heating action . . . by use of a relatively small apparatus". My invention builds on Dr. Goddards work and results in a new and improved invention, which provides significant objects and advantages primarily resulting from the elimination of components and the further development of the phenomena of direct solar absorption.

OBJECTS AND ADVANTAGES

Accordingly several objects and advantages of my invention are that the apparatus is simple to manufacture and there are no moving parts requiring service, repair or maintenance.

Another significant advantage of the invention is that absorption does not depend on the reflecting or absorbing power of the working fluid at any wave length, but rather on the concentration of solar flux therefore any transparent working fluid can be used.

A related object is that absorption is not sensitive to the volume of the working fluid therefore the same size invention apparatus can be used with a wide variety of primary concentrator sizes and the same apparatus can be used to heat both liquids and gases.

A further advantage is that the heating of the working fluid takes place substantially equally throughout a cross section of the vessel, thereby reducing hot spots which hold the potential for increased heat loss and reduced operating efficiency.

A major advantage of the invention is the elimination of a black body absorber, thereby allowing for direct absorption of energy by the working fluid. There is only a nominal amount of heat transfer by means of conduction therefore the invention provides not only the elimination of a major component of the prior art, a black body absorber, but also the simplification of the means of heat transfer.

A further object is that the methods and techniques of nonimaging optics permits the concentration of solar flux at wide collection angles. High collection optics can be used to advantage at every level in the design of the invention to optimize the balance of the concentration of solar flux, increasing or decreasing this concentration in consideration of the requirements on tracking, component tolerance and precision thereby producing significantly broad apparatus design parameters, which will result in very cost-effective applications of the invention.

Yet another object of the invention is that it is relatively light weight making it less expensive to produce and reducing the structural requirements for supporting a primary concentrator thereby adding additionally to the cost-effectiveness of this means of producing power.

A final but very significant object is the synergetic result of combining the elements of the invention: ultra high concentration solar nonimaging optics taken together with boiler and nozzle technology produces an apparatus which can deliver a large heating effect and power potential relative to its size, weight and cost.

DESCRIPTIONS OF DRAWINGS

The foregoing and other objects, features and advantages of the invention will become more fully understood from the following description of the preferred embodiments of the invention as illustrated in the accompanying drawings in which like reference characters refer to the same parts throughout the different views. The drawings are not necessarily to scale, emphasis instead being placed upon illustrating the principles of the invention:

FIG. 7 is an exploded view of the invention embodiment of

Figure 6:
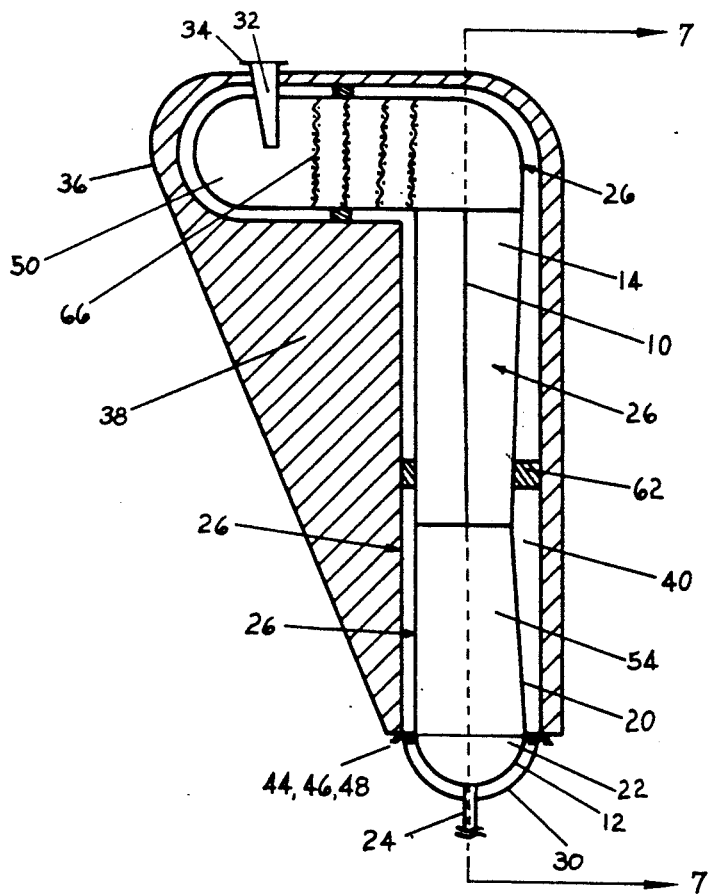
FIG. 6 is a cross sectional view of an embodiment of the invention which utilizies a cone as an aperture and features a vacuum space surrounding the internal vessel.

FIG. 6 taken at section line 7—7 and illustrating how the invention can be fabricated and assembled.

Figure 4:
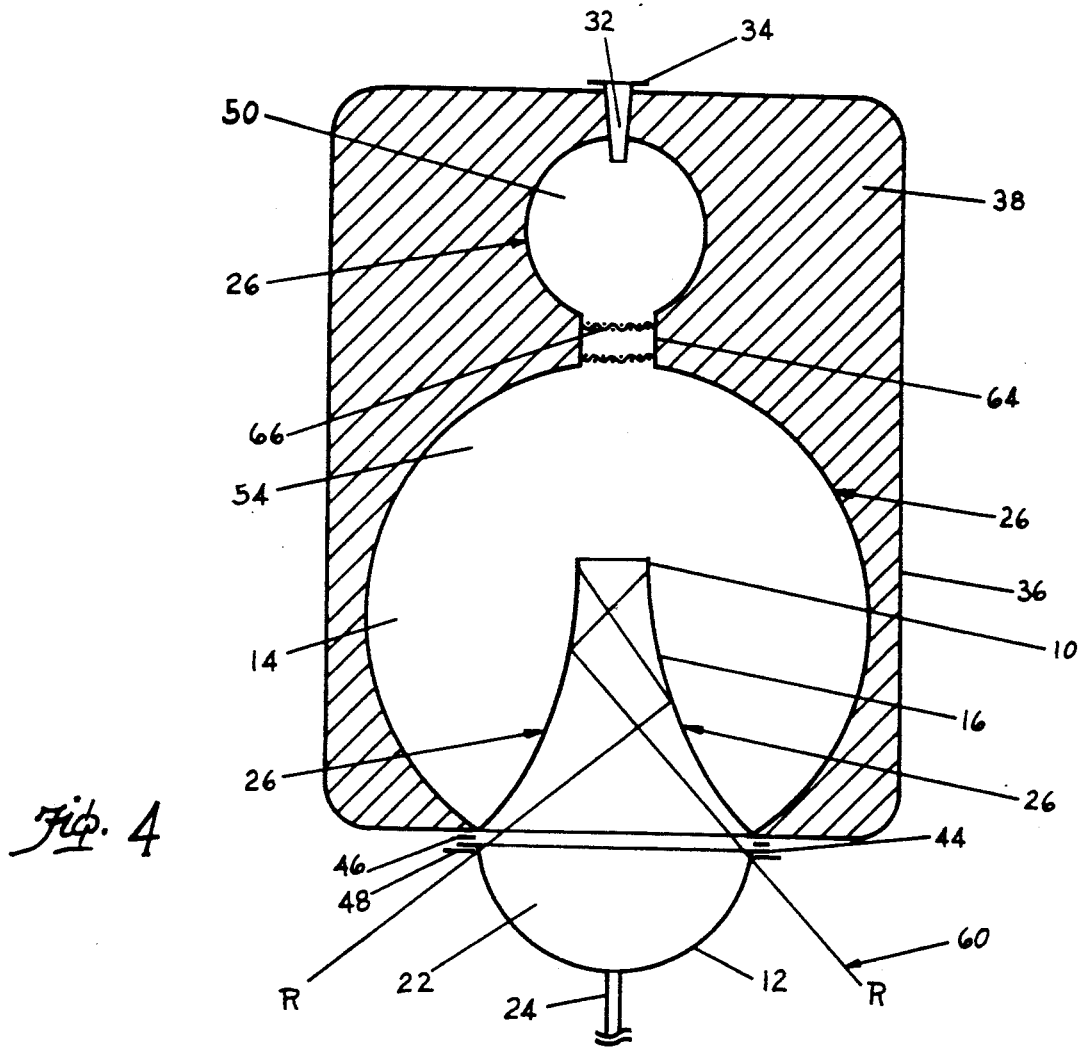
FIG. 4 is a cross sectional view of an embodiment of the invention which utilizes a flow line concentrator as a secondary concentrator aperture and a spherical multiple reflection chamber.
Figure 8:
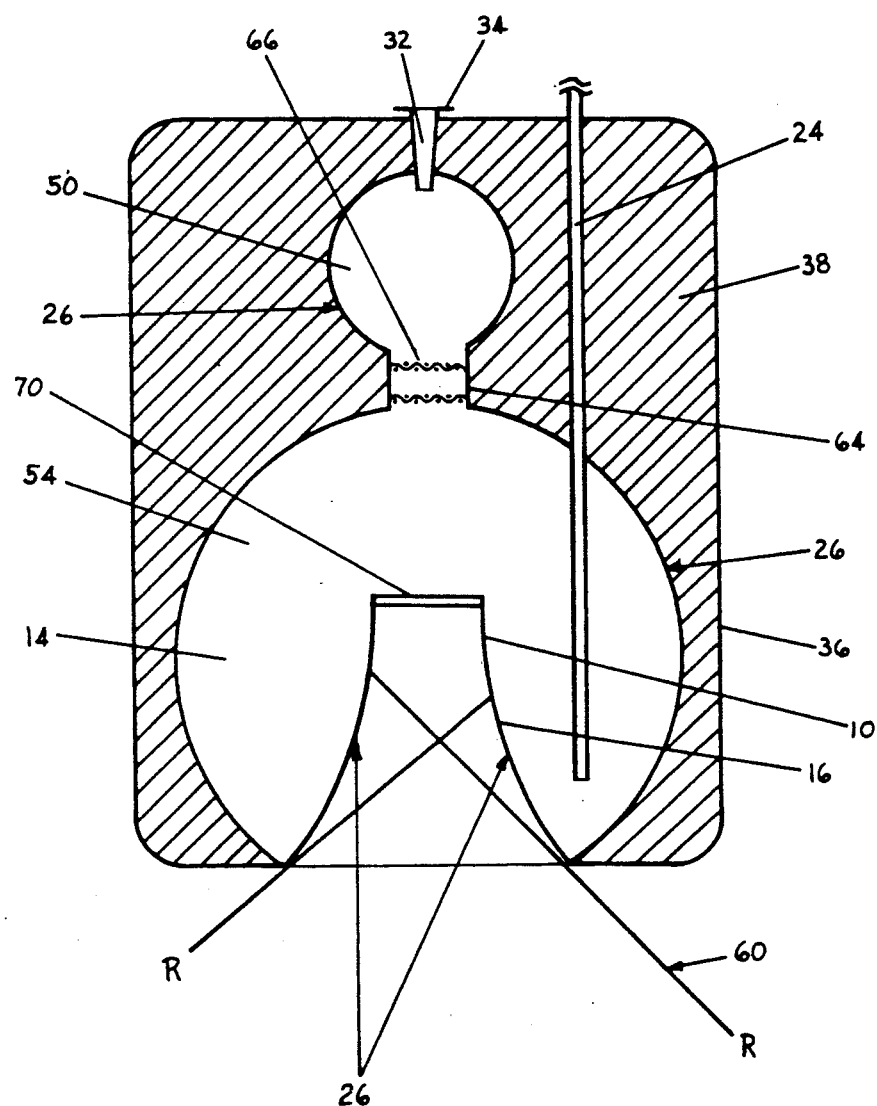

FIG. 8 is an embodiment of the invention similar to FIG. 4 but showing an alternate aperture closure.

DRAWING REFERENCE NUMERALS

10—Multiple reflection baffle
12—Hemispherical aperture window
14—Multiple reflection chamber
16—Flow line concentrator (FLC)
18—Compound parabolic concentrator (CPC)
20—Cone concentrator
22—Aperture
24—Working fluid delivery tube
26—Reflective surface
28—Reflective aperture enlarger (CPC)
30—Secondary hemispherical aperture window
32—Nozzle
34—Turbine mounting flange
36—Protective weather covering
38—Thermal insulation
40—Vacuum cavity thermal break
42—Vacuum vessel
44—Window mounting flange
46—Window flange seal
48—Window flange ring
50—Expansion conduit
52—Reflection conduit
54—Working fluid cavity
56—Vacuum outlet
58—Primary concentrator
60—Solar rays
62—Thermal insulation spacers
64—Conduit
66—Wire screen
68—Secondary concentrator
70—Lense

DESCRIPTION OF THE PREFERRED EMBODIMENTS OF THE INVENTION

Figure 1:
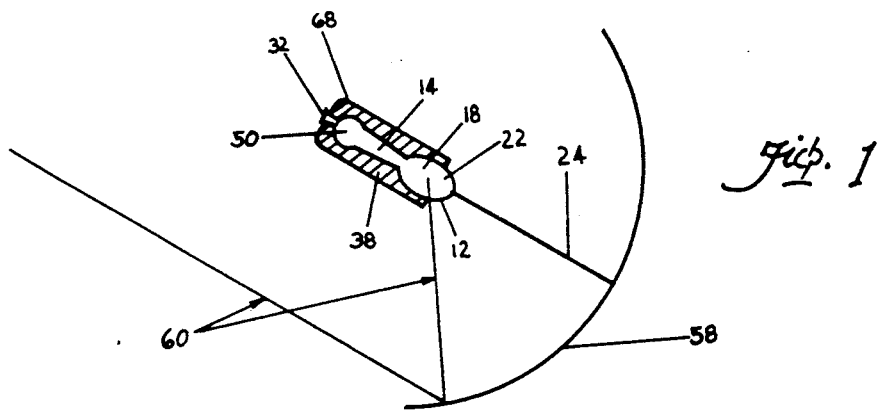
FIG. 1 is a representation of the relationship between a primary concentrator and a secondary concentrator, the main apparatus of the invention.
Figure 2:
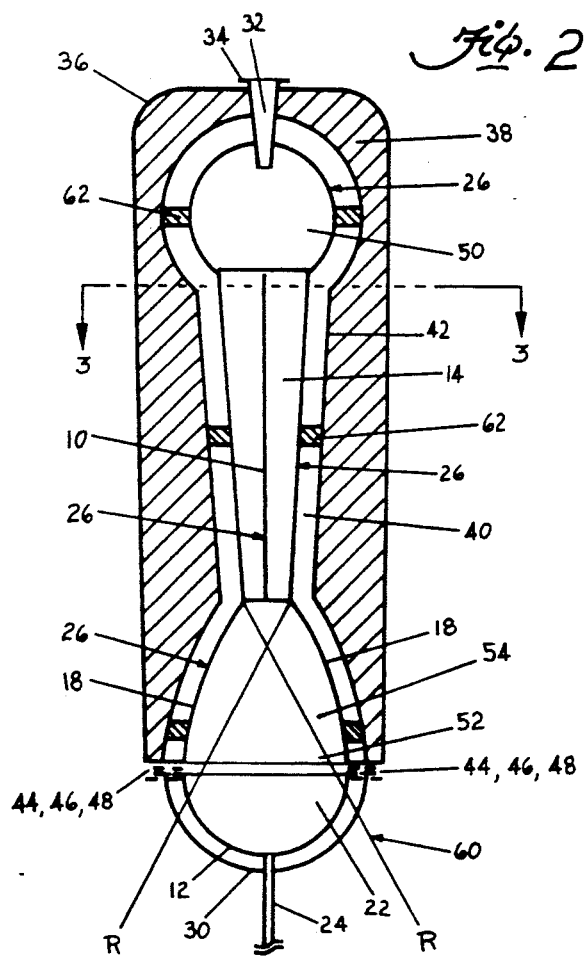
FIG. 2 is a cross sectional view of an embodiment of the invention shown in FIG. 1 which utilizes a compound parabolic concentrator as an aperture to the secondary concentrator.
Figure 3:
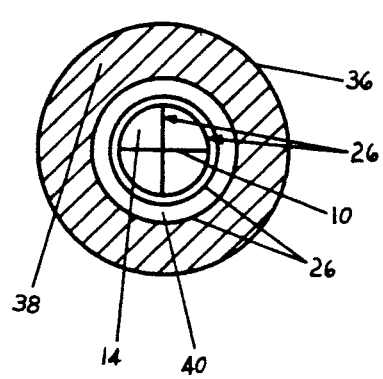
FIG. 3 is a section of FIG. 2 taken at section line 3—3

Referring to FIG. 1 which is an illustration of the apparatus seen in FIG. 2 as shown in relationship to a primary concentrator 58. Solar rays 60 are reflected from the reflective concave surface of primary concentrator 58 to a focal point approximately inside aperture 22. The first embodiment of the invention is illustrated in detail by referring to FIG. 2. Solar rays 60 are shown reflected from a primary concentrator 58 and entering a reflection conduit 52. In the embodiment of the invention shown in FOG. 2 the reflection conduit 52 is comprised of a compound parabolic concentrator 18 hereafter referred to as CPC and more specifically described as being a CPC of revolution having an interior reflective surface 26. Closing the aperture 22 of reflection conduit 52 by means of window mounting flange 44, window flange seal 46 and window flange ring and bolts 48 is a hemispherical aperture window 12. Working fluid which maybe any suitable transparent liquid or gas is delivered into the reflection conduit 52 by the working fluid delivery tube 24 which passes through secondary hemispherical aperture window 30 and is affixed by an appropriate means to a port in apeture window 12. Solar rays 60 and a working fluid are directed through the rear aperture into multiple reflection chamber 14 passing around multiple reflection baffle 10 and in contact with reflective surfaces 26 as best shown by referring to FIG. 3. Multiple reflection chamber 14 is joined to expansion conduit 50 which also has an interior reflective surface 26. A nozzle 32 is joined to expansion conduit 50 so that the small end of the nozzle 32 is located approximately in the center of expansion conduit 50. Nozzle 32 has its large end located outside expansion conduit 50 and has a mounting flange 34 suitable for affixing a turbine or similar device. Surrounding the aforementioned components is a thermal insulation barrier 38 and a protective weather covering 36. Vacuum vessel 42 surrounds nozzle 32, expansion conduit 50, multiple reflection chamber 14 and CPC 18 between thermal insulation barrier 38 and is closed by secondary hemispherical window 30 with an arrangement of a window mounting flange 44, window flange seal 46, window flange ring 48 thereby providing a vacuum cavity thermal break 40 which is supported by thermal insulation spacers 62.

A second embodiment of the invention is shown in FIG. 4 and illustrates a different configuration of the invention. In FIG. 4 working fluid is conveyed into aperture 22 by working fluid delivery tube 24 which is connected to hemispherical aperture window 12. Aperture window 12 is connected to a flow line concentrator 16, which may also be designated as a hyperbolic concentrator of revolution but, hereafter referred to as FLC by an arrangement of window mounting flange 44, window flange seal 46 and window flange ring 48. FLC 16 having an interior reflective surface 26. Solar rays 60 passing through aperture 22 are directed into multiple reflection chamber 14 which in this embodiment is spherical in configuration enclosing a working fluid cavity 54. The exterior surface of FLC 16 is a reflective surface 26 and in this embodiment functions as a multiple reflection baffle 10. Multiple reflection chamber 14 is connected to expansion conduit 50 by a conduit 64 which can be fitted with a plurality of fine wire screens 66 in cases where the working fluid is vaporized liquid. A nozzle 32 penetrates into expansion conduit 50 its outlet being fitted with a mounting flange 34. Surrounding the configuration of components is thermal insulation 38 providing a surrounding thermal barrier with a protective weather covering 36 in a manner which leaves the window aperture 12 open.

Figure 5:
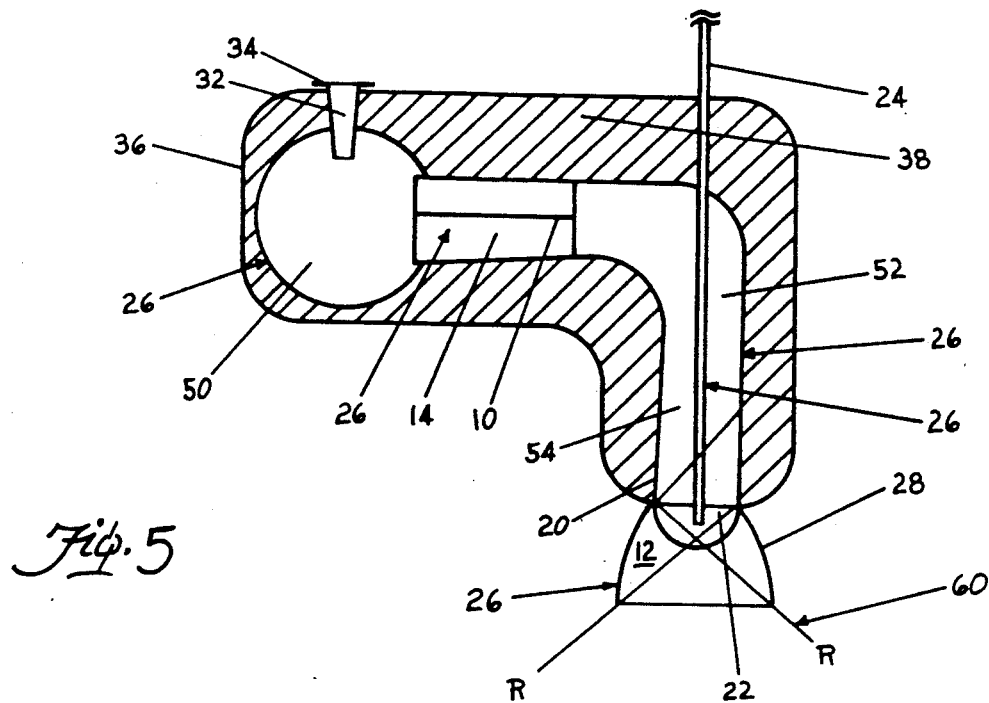
FIG. 5 is a cross sectional view of an embodiment of the invention which utilizes a cone as a secondary concentrator aperture and features the uses of a compound parabolic concentrator to enlarge the aperture area.

Referring to FIG. 5 another embodiment of the invention is shown. Solar rays 60 are directed into a CPC reflective aperture enlarger 28 and through hemispherical aperture window 12 entering aperture 22 of cone concentrator 20 which has reflective interior surfaces 26. It is anticipated by the inventor that the reflective aperture enlarger 28 could be controlled to adjust the forward aperture diameter automatically thereby compensating for tracking inefficiency in a primary concentrator. Working fluid is introduced into the space utilized as both a working fluid cavity 54 and a reflection conduit 52 by working fluid delivery tube 24 which has a reflective exterior surface 26. The reflection conduit 52 has an approximately ninety degree bend thereafter is located multiple reflection chamber 14 which is fitted with a multiple reflection baffle 10 as approximately shown in FIG. 3. Referring back to FIG. 5 the multiple reflection chamber 14 is connected to an expansion conduit 50 which also has reflective interior surfaces 26. Expansion conduit 50 has a nozzle 32 joined in an aforementioned manner and a mounting flange 34. The vessel is surrounded by thermal insulation 38 and protective weather convering 36.

Figure 7:
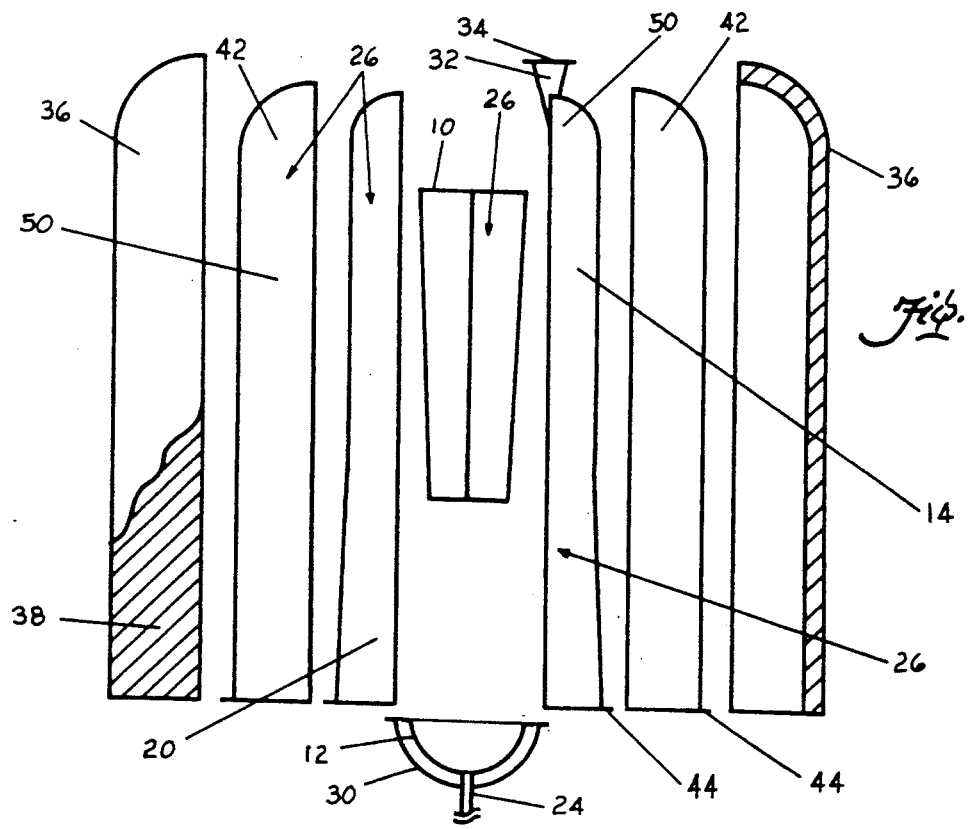

FIG. 6 maybe the most efficient embodiment of the invention for a heat cycle using water as a working fluid especially in those case where the apparatus can be in close proximity to a condensor thereby reducing the return line pumping and heat loss requirements. In FIG. 7 an exploded view represents the inventors concept of how the invention can be fabricated to mass production. Materials chosen for the manufacture of the invention must be select for satisfactory characteristics of engineering performance at very high temperatures. The inventor recommends high temperature stainless steel alloy, high temperature and U.V. protected silicon seals and quartz glass as cost-effective materials of manufacture. All interior surfaces 26 with the possible exception of the nozzle throat should be polished and highly reflective to solar rays 60.

Referring back to FIGS. 6 and 7 solar power in the form of sunlight penetrates aperture windows 12 and 30 and is focused approximately at the focal point in aperture 22. It is directed by a plurality of reflections through a multiple reflection chamber 14. Water is circulated into the working fluid cavity 54 by means of working fluid deliver tube 24 having an exterior reflective surface 26. In the multiple reflection chamber 14 a plurality of reflective interior surfaces enhances an ultra high concentration of solar flux and preceeds the absorption of solar energy into water as heat energy. Thereby vaporizing the water which can be harvested as steam energy and used to generate power. The presence of the multiple reflection baffle 10 provides for a greater plurality of interior reflections and enhances the energy transfer from solar to heat energy. It is anticipated that better reflective baffles and light traps can be designed particularly, by ultilizing computer enhanced optical engineering, thereby increasing the efficiency of the device. Vapor is expanded dryed and mixed in an expansion conduit 50 wire screens 66 are provided in conduit 50 to break up water droplets in the vapor. A nozzle 32 is provided to direct steam into an turbine held in place by turbine mounting flange 34. Heat loss from the apparatus is controlled by thermal insulation 38 which is protected from weather by protective weather covering 36. In this embodiment of the invention a vacuum vessel 42 surrounds the interior cavities and is closed with secondary hemispherical aperture window 30 affixed with a flange arangement 44, 46, 48. The interior surface of vacuum vessel 42 is a reflective surface 26 providing an additional barrier to heat loss by radiation. The vacuum cavity thermal break 40 is supported in position by thermal insulation spacers 62 and can be evacuated to a negative pressure through vacuum outlet 56 and sealed. Referring specifically to FIG. 7 the exploded view is intended to show that this embodiment of the invention can be made in identical segments by pressure forming or casting the segments. The segments can then be polished on their reflective surfaces and joined together with a welded seam or joined by means of a flange and bolt arrangement.

FIG. 8 represents an embodiment of the invention closely related to the embodiment described in FIG. 4. The apparatus is spherical providing for a multiple reflection chamber 14 and a working fluid cavity 54 which is closed at the smaller rear aperture of secondary concentrator 68 in this embodiment shown as a FLC 16 by a lense 70 affixed and providing a sealed vessel by appropriate hardware means. Working fluid delivery tube 24 is shown penetrating the wall of working fluid cavity 54 providing the means to supply working fluid. This embodiment eliminates the hemispherical aperture window 12 reducing the size of the glass component in the embodiment described in FIG. 4.

The operation of all of the embodiments of the invention is identical in principle. The invention may be included in either an open or closed loop heat cycle. A primary concentrator 58 is used in conjunction with a secondary concentrator 68 and a multiple reflection chamber 14 to produce an ultra high energy concentration of solar flux. Multiple reflection chamber 14 can be optimized by creating an intense reflective pattern at an approximately perpendicular angle to the solar flux that enters the chamber. The passage of light through the channel 14 is essentially slowed down, thereby increasing its concentration. Thermocynamically the highly reflective interior of the multiple reflection channel is equivalent to a highly absorbing body or "black body". It also has the advantage of requiring less surface area for an equivalent amount of heat exchange. A transparent working fluid is delivered into the space occupied by this ultra high energy concentration. Spontaneous absorption occurs thereby heating the fluid which can then be conveyed away to produce a power potential. It seems likely that increased pressure in the working fluid will further enhance absorption. The inventor anticipates that computer enhancements of the optical geometry of the embodiments of the invention and improvements in materials, insulation and the sonics of nozzle design will further optimize the operational efficiency of this solar power generator.

Thus the reader will see that this invention provides excellent characteristics for heat transfer and power production. The invention is also simple to manufacture and provides for cost-effective reductions in weight. While my above description contains many specificities, these should not be construed as limitations on the scope of the invention, but rather as an exemplification of preferred embodiments thereof. Many other variations are possible. For example the invention might be adapted to the heating of gases for the production of plasma as in a solar driven magnetohydrodynamic generator. Accordingly, the scope of the invention should be determined not by the embodiments illustrated, but by the appended claims and their legal equivalents.

I claim:

1. A method of converting solar energy into heat energy, thereby generating power comprising the steps:
   a) focusing said solar energy by means of a primary concentrator,
   b) concentrating said solar energy from said primary concentrator by means of a secondary concentrator located at the focal point of said primary concentrator,
   c) slowing the flux of said solar energy from said secondary concentrator by means of a multiple reflection chamber attached to the rear apeture of the secondary concentrator,
   d) circulating a working fluid by means of a working fluid delivery tube into said secondary concentrator and said multiple reflection chamber,
   e) absorbing said solar energy into said working fluid by means of an ultra high concentration of said solar energy in said multiple reflection chamber,
   f) insulating said working fluid by means of a surrounding thermal barrier,
   g) exhausting the heat working fluid by means as of a nozzle joined to said multiple reflection chamber,
   h) replacing said working fluid by means of a working fluid delivery tube, thereby completing a cycle for generating power.

2. A method for heating a transparent working fluid with solar rays comprising the steps:
   a) focusing said solar rays from the sun into aperture of a secondary concentrator by means of a primary concentrator,
   b) directing said solar rays by means of said secondary concentrator into a chamber comprising a plurality of reflective interior surfaces, thereby concentrating said solar rays,
   c) circulating said transparent working fluid into said chamber providing a means whereby the concentration of solar rays are absorbed by said working fluid and heated,
   d) insulating said chamber by means of a surrounding thermal barrier,
   e) exhausting the heated working fluid, thereby producing a power potential.

3. An apparatus for heating a transparent working fluid with solar rays to produce power comprising:
   a) a primary concentrator having a reflective concave surface providing the means to direct said solar rays to a focal point,
   b) a secondary concentrator having an aperture closed by a hemispherical window positioned approximately at the focal point of said primary concentrator and a rear aperture,
   c) a multiple reflection chamber joined to the rear aperture of said secondary concentrator comprising a plurality of interior reflective surfaces,
   d) a working fluid delivery tube providing a means for said transparent working fluid to be circulated into the cavity comprising first said secondary concentrator and second said multiple reflection chamber,
   e) a means to reduce heat loss from said apparatus comprising surrounding thermal insulation,
   f) a nozzle joined by a conduit to said multiple reflection chamber comprising the means for the heated working fluid to be discharged, thereby producing power.

4. A secondary concentrator of the apparatus of claim 3 comprising a compound parabolic concentrator of revolution.

5. A secondary concentrator of the apparatus of claim 3 comprising a flow line concentrator of revolution.

6. A secondary concentrator of the apparatus of claim 3 comprising a cone concentrator.

7. A multiple reflection chamber of the apparatus of claim 3 comprising:
   a) an elongated cone shaped chamber with the diameter increasing from bottom to top.
   b) a multiple reflection baffle comprising a plurality of reflective surfaces and located inside said multiple reflection chamber.

8. A means to reduce heat loss of the apparatus of claim 3 comprising:
   a) a vacuum cavity surrounding the internal cavities of said apparatus having an interior reflective surface and being closed at the apeture by a hemispherical window,
   b) an insulation layer surrounding the internal cavities of said apparatus and having a protective weather covering exterior surface.

9. A multiple reflection chamber of the apparatus of claim 3 comprising:
   a) a spherical chamber with an interior reflective surface,
   b) a multiple reflection baffle with a plurality of reflective surfaces enclosed by said spherical chamber.

10. An apparatus for a solar power generator having a heat cycle to generate power comprising:
    a) a working fluid comprising a transparent fluid,
    b) a window comprising a hemispherical transparent aperture,
    c) a port in said window comprising an inlet for said working fluid,
    d) a secondary concentrator comprising the means to be attached to said window and the means to reflect solar rays from a primary concentrator to a rear aperture,
    e) a multiple reflection chamber attached to the rear aperture having a plurality of reflective surfaces as the means of concentrating the solar rays,
    f) a means to circulate said working fluid through said secondary concentrator and said multiple reflection chamber, thereby providing a heat transfer by absorption,
    g) a expansion conduit attached to said multiple reflection chamber,
    h) a means to control heat loss comprising a surrounding thermal insulation barrier,
    i) a nozzle attached to said expansion conduit providing the means to exhaust heated working fluid to produce power.

11. An apparatus for converting solar energy into heat energy, thereby generating power comprising:
    a) a means to focus said solar energy comprising a primary concentrator,
    b) a means to concentrate said solar energy comprising a secondary concentrator positioned at the focal point of said primary concentrator,
    c) a means to slow the flux of solar energy comprising a multiple reflection chamber attached to the rear aperture of said secondary concentrator,
    d) a means to circulate a working fluid comprising a working fluid delivery tube having a port open to said secondary concentrator,
    e) a means to absorb said solar energy into said working fluid comprising an ultra high concentration of said solar energy in said multiple reflection chamber,
    f) a means to insulate said working fluid from heat loss comprising a surrounding thermal insulation barrier,
    g) a means to exhaust the heated working fluid comprising a nozzle joined to said multiple reflection chamber, thereby generating power.

* * * * *